Aug. 30, 1955  K. BERSTECHER  2,716,311
CENTERLESS MACHINING APPARATUS
Filed April 18, 1950  5 Sheets-Sheet 1

INVENTOR:
KARL BERSTECHER
BY:

Aug. 30, 1955  K. BERSTECHER  2,716,311
CENTERLESS MACHINING APPARATUS
Filed April 18, 1950  5 Sheets-Sheet 2

INVENTOR:
KARL BERSTECHER
BY:

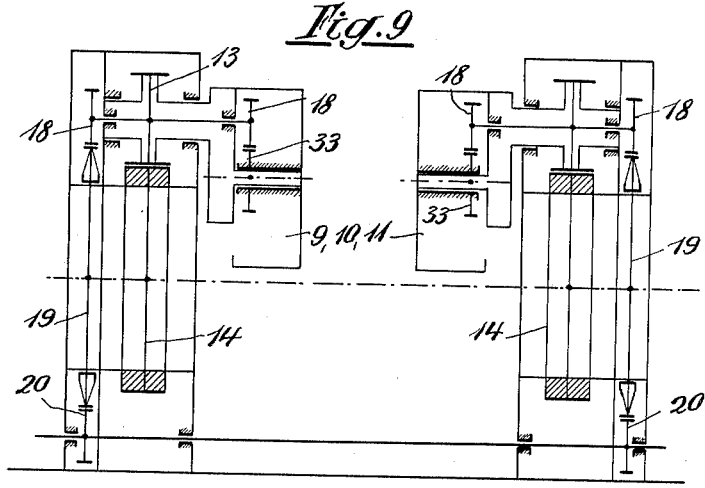
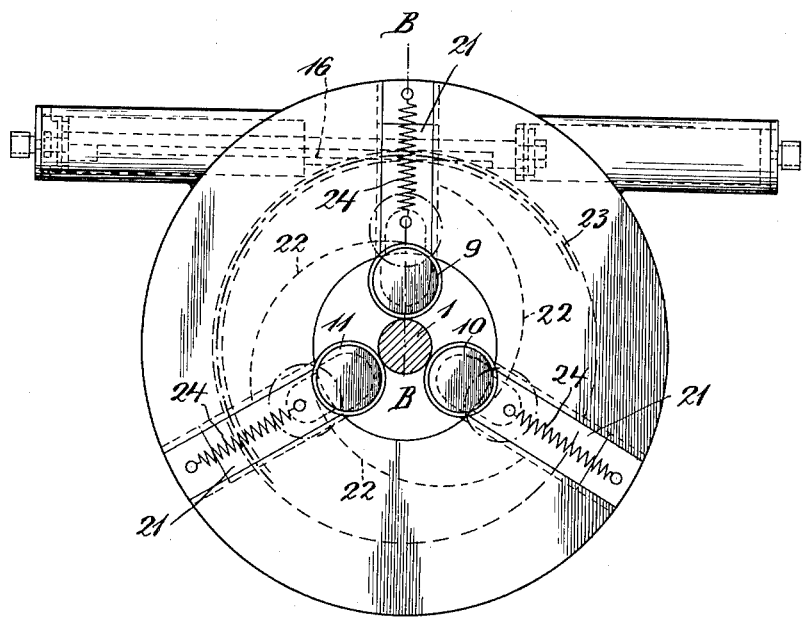

Aug. 30, 1955　　　K. BERSTECHER　　　2,716,311
CENTERLESS MACHINING APPARATUS
Filed April 18, 1950　　　5 Sheets-Sheet 4

INVENTOR:
KARL BERSTECHER
BY:

Aug. 30, 1955 K. BERSTECHER 2,716,311
CENTERLESS MACHINING APPARATUS
Filed April 18, 1950
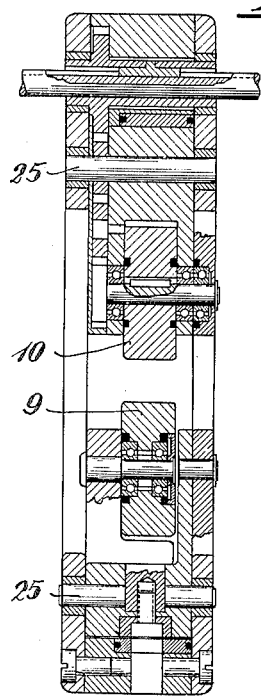
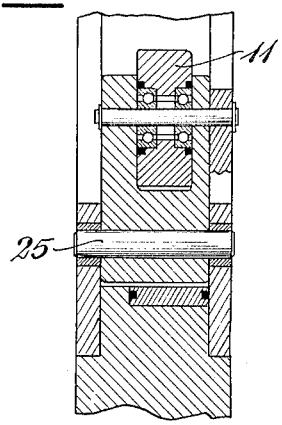
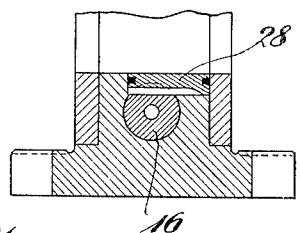
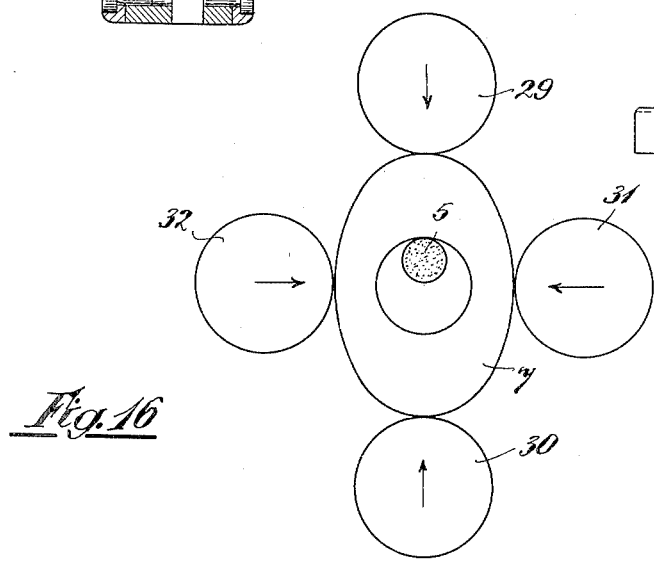
INVENTOR:
KARL BERSTECHER
BY:

United States Patent Office 2,716,311
Patented Aug. 30, 1955

2,716,311

CENTERLESS MACHINING APPARATUS

Karl Berstecher, Stuttgart-Feuerbach, Germany

Application April 18, 1950, Serial No. 156,556

Claims priority, application Switzerland May 6, 1949

8 Claims. (Cl. 51—103)

My invention relates to mode of operation and apparatus for centerless metal-cutting operations.

My invention is of utility in various industries for use in working on various types of work; and it is of particular value in the production of cylindrical surfaces by means of centerless grinding operations. Because of this particular utility my invention will be described in connection with apparatus for centerless grinding, but I do not wish my invention to be limited to such use.

Apparatus is in use at the present time for performing such centerless grinding, but such apparatus has certain disadvantages which are overcome by my present invention.

It is an object of my invention to provide a guide and adjustment means attachment of the character mentioned having means for keeping the center of gravity of the work always in the center of the system.

It is another object of my invention to provide an attachment of the character mentioned which may be attached to a grinding machine of conventional construction, thus making the building of special machine tools unnecessary.

It is another object of my invention to provide an apparatus of the character mentioned which will accommodate work of different external sizes for example of oval or out of round cross-section, and produce accurate cylindrical surfaces as well on the outside as on the inside of the work, independent of the outside shape of the work.

A still further object of my invention is to provide an apparatus of the character mentioned that can be operated with the greatest precision even by workmen with but little experience.

Modes of operation for centerless grinding are known for external as well as internal grinding.

For external grinding an arrangement above all has proved its usefulness in which the work through the operative effect of a driven speed adjusting pulley or roller and a gib is being machined by means of a grinding wheel supported in bearings opposite to the gib. Thereby it became apparent that the inevitable variableness of the frictional relation between the work and the grinding wheel, speed adjusting pulley and gib produces irregularities in the product obtained. By way of example instead of the requisite cylindrical bodies, bodies of humpy out of round cross-section of all around equal diameter are produced, that is, bodies with straight and parallel remaining generating lines of equal diametrical distance but unequal distance from the center of gravity of the body.

The heavier the work the greater the error. Therefore in the centerless grinding of bars separate driving means must be provided at both sides of the place being machined, but thereby the deficiencies are only partially obviated, while the real advantages of the centerless grinding are lost in part.

It has already been proposed to replace the gib by a guide roller, hence have the work supported and rotated by means of two guide rollers driven by means of a speed adjusting pulley whereby the angular adjusted grinding wheel presses the work against the guide rollers and at the same time imparts the axial feed upon the work.

Owing to the following grounds this arrangement has not turned out well: (a) The secure driving of the work through the guide rollers is dependent upon the relation of friction at the lines of contact, hence not only upon the coefficient of friction at the lines of contact, but also upon the magnitude of pressure. But the latter is determined solely by the component of abrasive force. Though the pressure between grinding wheel and work is now very high the radial component of abrasive force is relatively small and varies greatly with the condition of the grinding wheel. Owing to this one obtains an irregular driving and feeding of the work and in consequence thereof a chattery cut and a piece of work of out of round cross-section. (b) The work is not securely guided by the guide rollers during the grinding operation because the already ground portion of the work owing to its smaller diameter does not rest any more on the guide rollers and therefore it is not uniformly driven.

In centerless internal grinding the work is placed between two stationary rollers (after adjustment to the proper diameter of the work) which are rotatably mounted in bearings and pressed against the work by means of a third yielding roller. Here in each case the position of the work opposite to the grinding wheel is determined by the external shape of the work. Consequently the outside must have been finished previously and for reasons of economical production this is usually done by means of centerless grinding. Then the irregularities remaining or arisen during the external grinding operation will effect the internal grinding operation, that is, the surface being produced by internal grinding in a sense automatically copying the external form.

The various objects and features of my invention will be fully understood from the detailed description of the heretofore customary mode of operation and such of the operative characteristics of the new method, together with suitable apparatus for its application, throughout which description reference is made to the accompanying diagrammatic drawing, in which.

Figure 7:
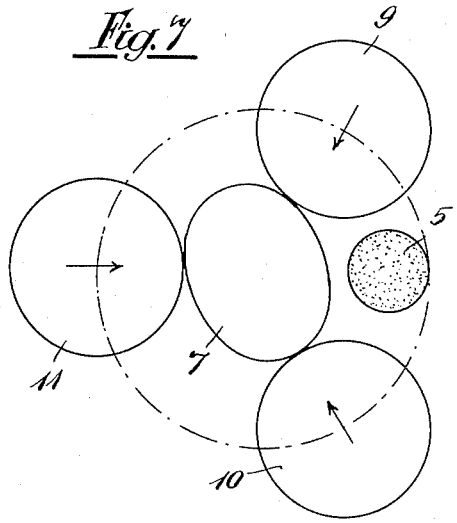

Fig. 7 the same in another position.

Figure 8:
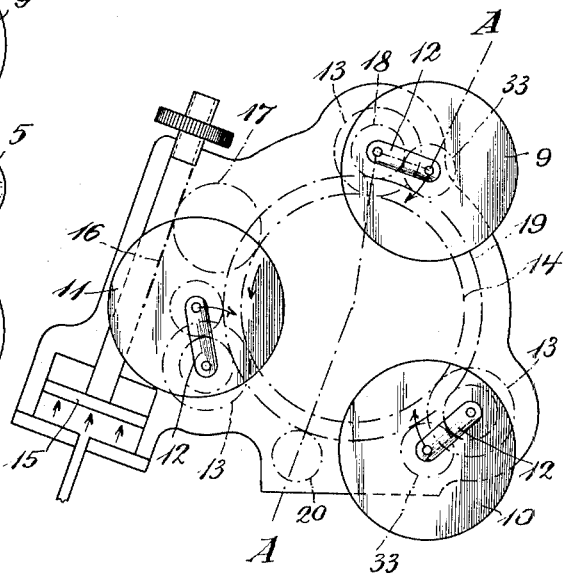

Fig. 8 is a diagrammatic elevation of an embodiment of a device for the application of the new mode of operation.

Fig. 9 is a section taken on the line A—A of Fig. 8.

Fig. 10 shows in a same elevation as Fig. 8 a second embodiment of the invention.

Figure 11:
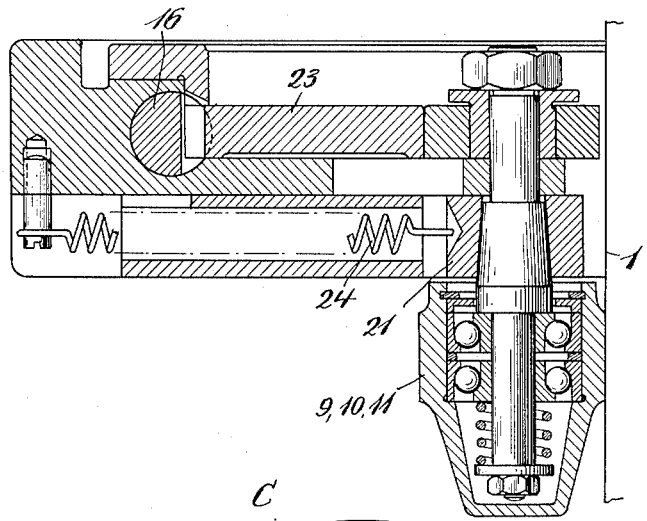

Fig. 11 is a section taken on the line B—B of Fig. 10.

Figure 12:
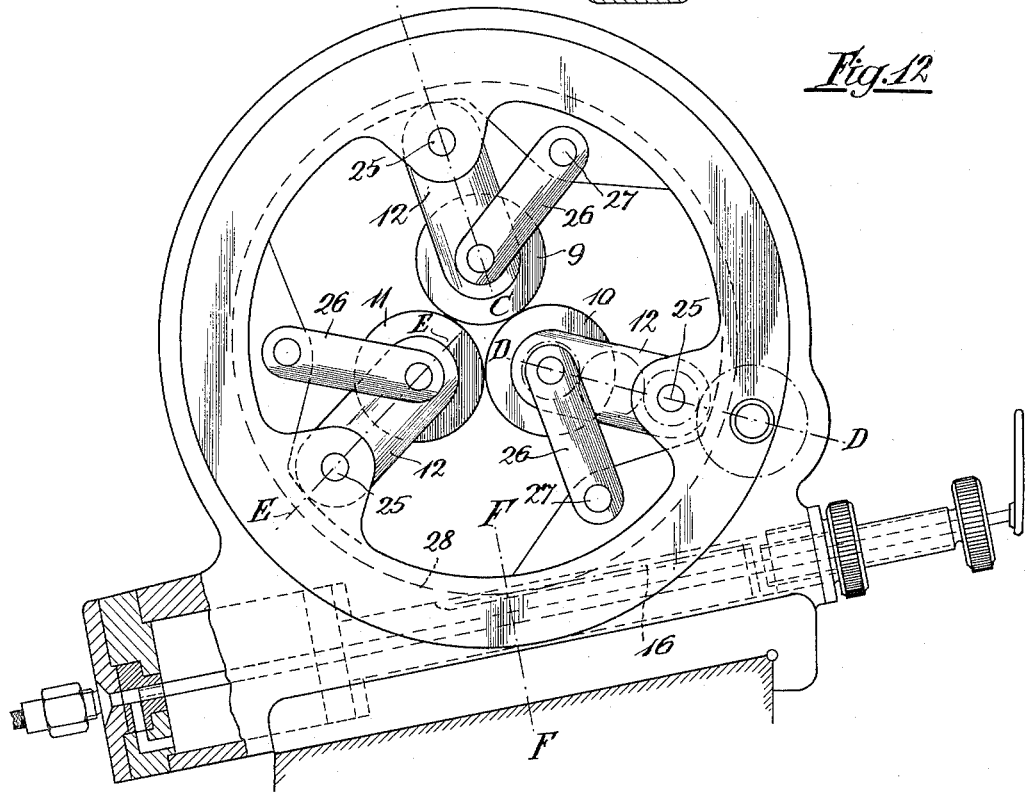

Fig. 12 is a front elevation of a third embodiment of the invention.

Fig. 13 is in its lower part a section taken on the line C—C, and in its upper part a section taken on the line D—D of Fig. 12.

Fig. 14 is a section taken on the line E—E of Fig. 12.

Fig. 15 is a section taken on the line F—F of Fig. 12.

Fig. 16 shows diagrammatically a further embodiment of the invention with four guide rollers for the internal machining of bodies of oval cross-section.

Figure 1:
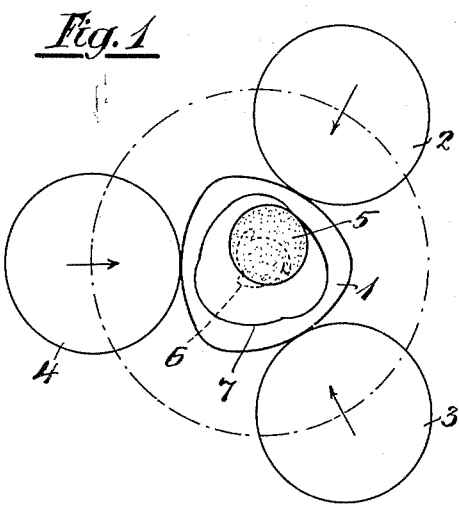
Fig. 1 shows diagrammatically the mode of operation in the internal grinding of a body of out of round cross-section with one of the known devices.

When in conformity with Fig. 1 the inner surface of an almost cylindrical body with a humpy out of round outside surface is centerless ground, whereby the body 1 rotates between a driving pulley 2 a guide roller 3 and a contact roller 4, and is being machined by means of the grinding wheel 5 which is set opposite to the driving pulley, it becomes apparent, then and there, that the center of gravity of the work moves to and fro about as indicated by the dotted line 6. This leads to the result that the grinding wheel produces an inner form according to line 7 and not a cylindrical surface with circular cross-section as desired.

Figure 2:
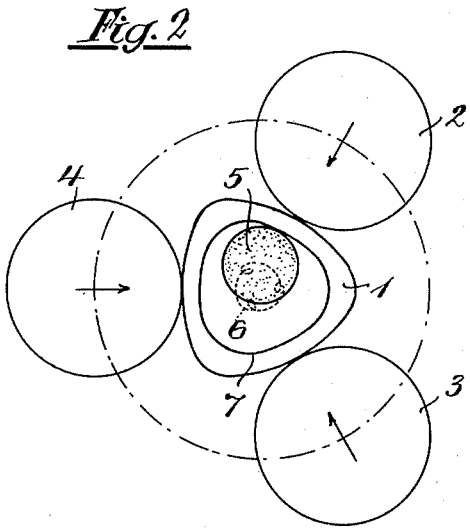
Fig. 2 shows the same mode of working with another likewise known device.

If in accordance with Fig. 2 the grinding wheel 5 is effective between driving pulley 2 and contact pulley 4 then the result will be somewhat different. But the disadvantage that the out of round outside form will reflect itself in the surface to be ground will, however, continue to be in existance.

Figure 3:
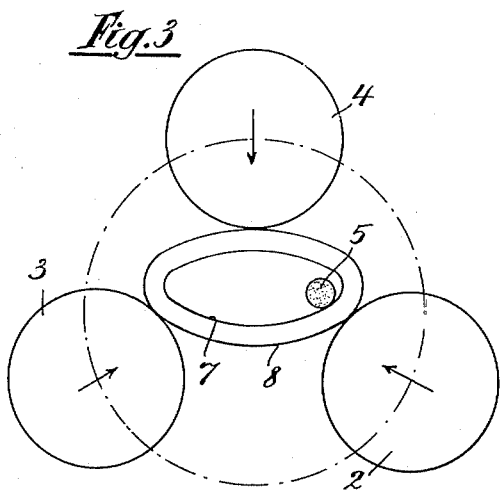
Fig. 3 shows diagrammatically the results of an internal grinding operation in a body of out of round cross-section.

These errors will also appear when the work is of other external form than that of a humpy out of round cylinder, for instance of oval shape. The case in point is illustrated diagrammatically in Fig. 3. Here also arises an oval 7 in the body 8 instead of the desired cylindrical internal form.

Figure 4:
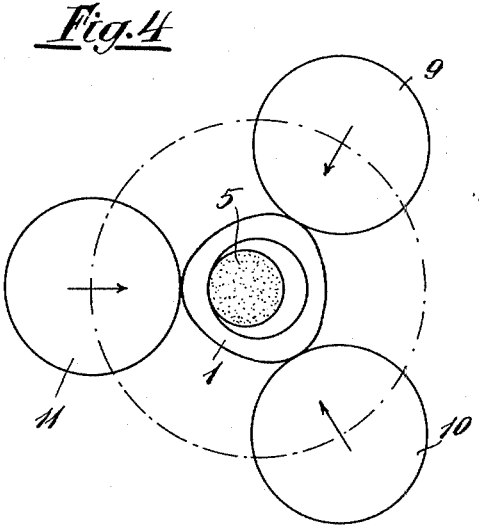
Fig. 4 shows the mode of operation in conformity with the new method in one of the characteristic positions of the body of out of round cross-section.
Figure 5:
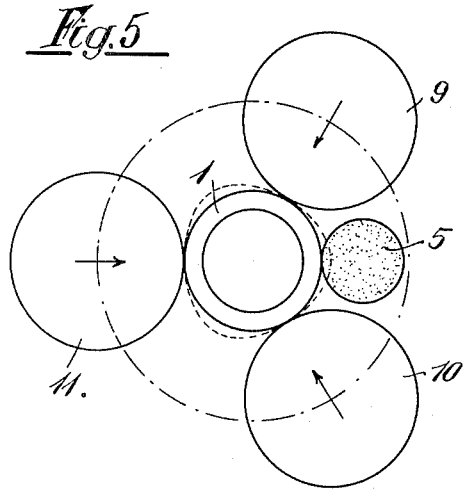
Fig. 5 shows the same in another position.

The above described disadvantages of the known modes of operation and devices are prevented in performing the machining in accordance with Figs. 4 and 5. Here the work 1 rotates between three rollers 9, 10, 11 which are equally disposed in a circle equidistant from each other, of which rollers at least one is utilized for the drive. These three rollers are coupled with each other in such a way that each roller will always be equidistant from the axis of the system as the others; but this distance will be variable.

In Fig. 4 a body whose outside is of humpy out of round shape is being machined by means of the grinding wheel 5 and the position is illustrated explicitly in which the three humps of the out of round body rest on the rollers. When the humps come between the rollers during the further rotation of the work, then all three rollers move symmetrically toward the center of the system and thus guide the work in turn that the center of gravity will remain in the center of the system. Consequently the inner surface will become circular, notwithstanding the humpy outside shape of the out of round body.

Also when the work 1 is machined externally by means of the same arrangement and function of the three rollers one finally obtains the cylindrical external surface (indicated by the full lines) from the out of round body indicated by the dotted lines (Fig. 5).

Figure 6:
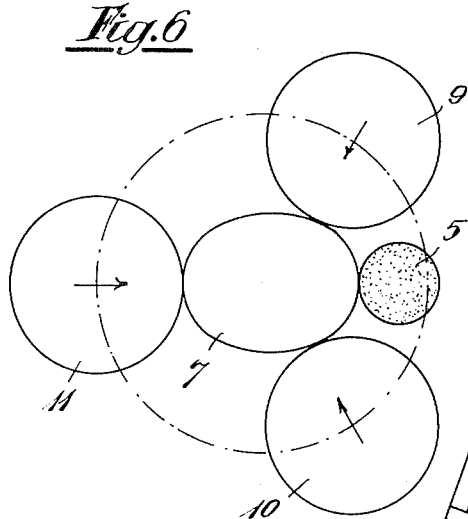
Fig. 6 illustrates the same arrangement in the machining of the outside surface of a body of oval cross-section for the correction of the external surface.

Figs. 6 and 7 show the effects of the new mode of operation and of the new apparatus in case the external shape of the work is not that of an out of round body, but that of an oval cylinder, and when out of this oval form an outside cylindrical surface is to be produced. Hereby it is then apparent that the oval will touch the three rollers 9, 10, 11 symmetrically in any position at pleasure. The grinding wheel 5 which is effective between the rollers 9 and 10 can invariably machine only the places of larger diameter, and this operation is repeated until the previous oval form is corrected to the form of an outside cylindrical surface. Fig. 7 shows a position of the work in which the grinding wheel is ineffectual.

The device by means of which it is attained that all three rollers 9, 10, 11 are always equidistant from the center of the system, though as one unit they can move toward the center, may be of optional design.

In Figs. 8 and 9 an example of this is shown. All the rollers are mounted on rocker arms 12 whose fulcrum points are arranged in a circle around the center of the system and at a distance of 120°. One gear 13 each is fast upon each rocker arm 12 and the three gears 13 mesh with a centrally located gear 14 which for reasons of adjustment of the rollers 9—11 can be rotated to various diameters of the work by means of an air piston 15, a rack 16 connected with it and an intermediate gear 17.

The rollers 9 and 10 each are driven through gears 33 which are fast upon the same shaft as the rollers. The gears 33, through a gear 18, mesh with a driving gear 19 which in turn is driven through a pinion 20.

Since the force for the adjustment of the rollers 9—11 and for the pressing of the rollers against the work is effected by means of an elastic agent, namely, by way of example, by means of compressed air pressing against the piston it is rendered possible that the elasticity permits the rollers to trace the described irregularities on the outside of the body during the machining operation.

The arrangement shown in Fig. 8 can of course be used successively if the work to be machined is of great length or when it is stepped in its diameter. If an axial feed becomes necessary it can be produced by means of angular adjustment of the axis of one of the three rollers.

In the arrangement in conformity with Fig. 10 instead of the rocker arms 12, for the combined movement and the coupling of the rollers 9—11, radially guided bearings of these rollers are used which are engaged by means of correspondingly shaped and among themselves alike cams 21. The cams in turn can be adjusted by means of a rim gear 23 having camming portions 22. A rack 16 serves again for this purpose which rack can be moved toward one side by means of compressed air acting against the reflex action of a tension spring 24 which is adapted to actuate the movement in the other direction.

In the arrangement in accordance with Figs. 12 to 15, the rollers 9, 10, 11 are supported again on rocker arms 12 whose fulcrum pins 25 are stationarily mounted in bearings. The rocker arms 12 are engaged on their free ends through a guide 26 each which in turn through a journal 27 engages a gear 28 which can be adjusted by means of the rack 16 as, by way of example, described above.

For the materialization of the invention the employment of three rollers is not an imperative necessity. Another number of rollers may also be used by way of example four rollers, in such a way that the connecting line of the axis of two rollers (disposed opposite to each other) is cut at a right angle by the connecting line of the other two rollers, whereby it is appropriate that all of them are alike and that the rollers of each pair of rollers are equidistant from the center of the system.

Between the four rollers 29 to 32 (in this instant) an oval body 7 is in place whose inner surface is to be machined by means of the grinding wheel 5 and explicitly so that a circular inner surface will be produced, notwithstanding the oval outside form. (Fig. 16.)

Hereby the rollers 29 and 30 (disposed opposite to each other) are again jointly guided so that both of them are equidistant from the center of the system, and likewise the rollers 31 and 32 also. In the rotation of the body around its center of gravity the rollers trace the outside form, but the center of gravity remains steadily in the center of the system. The guiding and controlling of the rollers, by the way, may be performed through the same or like means as hereinbefore described.

In all arrangements it is appropriate that the transmission agents employed for the adjustment of the three rollers and for pressing them against the work are not within self-locking range.

Although in the above description of available means for metal-cutting operations I have chosen to describe the grinding in particular, I do not wish my invention and the desired patent protection to be limited to grinding. On the contrary, my invention is also suitable for other metal-cutting operations as, for example, turning and the like and also intended for such use.

The new mode of operation in conformity with the invention is very simple to carry out, particularly when the above described apparatus is used, it can nevertheless be operated with the greatest precision even by workmen with but little experience. Important is also that it is not requisite to build special machine tools but that the invention can be materialized through the employment of an attachment fastened to grinding machines of conventional construction.

It will be obvious to those who are familiar with such matters that the details of construction may be varied from those shown by me and yet the essentials of the invention be retained. I therefore do not limit myself to such details.

I claim:

1. In a centerless cutting apparatus, in combination, at least three rotatably mounted rollers having centers located at equal distances from each other and from a central axis; gear means; reversible transmission means interconnecting said gear means and rollers to simultaneously move said rollers by equal amounts toward said central axis when said gear means moves in one direction and to move said gear means in an opposite direction when said rollers move away from said central axis; drive means operatively connected to at least one of said rollers for rotating the same so as to rotate a workpiece carried by said rollers; and yieldable pressure means operatively connected to said gear means to urge the same in said one direction so as to yieldably urge said rollers toward said central axis, said gear means being movable in said opposite direction against the action of said pressure means upon movement of said rollers away from said central axis.

2. In a centerless cutting apparatus, in combination, at least three rollers having centers located at equal distances from a central axis; at least three link members each connected adjacent one end thereof to said rollers, respectively, for supporting said rollers for rotation on said link members; gear means operatively connected to said link members adjacent ends opposite to said one ends thereof, respectively, for simultaneously turning said link members by equal amounts respectively about axes adjacent said opposite ends thereof so as to thereby simultaneously move said rollers by equal distances toward and away from said central axis; yieldable pressure means operatively connected to said gear means for actuating the same to yieldably urge said rollers toward said central axis; and drive means operatively connected to at least one of said rollers for rotating said roller to drive a work piece engaged by said rollers.

3. In a centerless cutting apparatus, in combination, at least three rollers having centers located at equal distances from a central axis; at least three link members each connected adjacent one end thereof to said rollers, respectively, for supporting said rollers for rotation on said link members; support means pivotally mounting each of said link members adjacent an end opposite to said one end thereof; gear means operatively connected to said one end of said link members, respectively, for simultaneously turning said link members by equal amounts about axes adjacent said opposite ends thereof so as to thereby simultaneously move said rollers by equal distances toward and away from said central axis; and yieldable pressure means operatively connected to said gear means for actuating the same to yieldably urge said rollers toward said central axis.

4. In a centerless cutting apparatus, in combination, at least three rollers having centers located at equal distances from a central axis; at least three link members each connected at one end portion thereof to said rollers, respectively, for supporting said rollers for rotation on said link members; gear means operatively connected to end portions of said link members opposite to said one end portions thereof, respectively, for simultaneously turning said link members by equal amounts about said opposite end portions thereof so as to thereby simultaneously move said rollers by equal distances toward and away from said central axis, said gear means compris- ing at least three gears fixedly connected to said opposite end portions of said link members, respectively, for rotating said link members about said opposite ends thereof, a common driving gear meshing with said three gears, and a rack meshing with said common driving gear; and yieldable pressure means operatively connected to said rack for actuating the same to yieldably urge said rollers toward said central axis.

5. In a centerless grinding apparatus, in combination, at least three rotatably mounted rollers having centers located at equal distances from a central axis; at least three link members each connected adjacent one end thereof to said rollers, respectively, for supporting said rollers for rotation on said link members, each of said link members being pivotally mounted adjacent an end opposite to said one end thereof; gear means operatively connected to said one end of said link members, respectively, for simultaneously turning said link members by equal amounts about said opposite ends thereof so as to thereby simultaneously move said rollers by equal distances toward and away from said central axis, said gear means comprising at least three additional link members respectively connected to said one end of said first-mentioned link members and a common driving gear pivotally connected to said additional link members, respectively, so that rotation of said common driving gear moves said additional link members to thereby pivot each of said first-mentioned link members about its opposite end for moving said rollers toward and away from said central axis; and yieldable pressure means operatively connected to said common driving gear of said gear means for actuating the same to yieldably urge said rollers toward said central axis.

6. In a centerless cutting apparatus, in combination, at least three rotatably mounted rollers having centers located at equal distances from a central axis; gear means; reversible transmission means interconnecting said gear means and rollers to simultaneously move said rollers by equal amounts toward said central axis when said gear means moves in one direction and to move said gear means in an opposite direction when said rollers move away from said central axis; yieldable pressure means operatively connected to said gear means to urge the same in said one direction so as to yieldably urge said rollers toward said central axis, said gear means being movable in said opposite direction against the action of said pressure means upon movement of said rollers away from said central axis; and drive means operatively connected to one of said rollers for rotating the latter so as to rotate a work piece engaged by said rollers.

7. In a centerless cutting apparatus, in combination, three rotatably mounted rollers having centers located at equal distances from a central axis, said rollers being angularly spaced from each other by 120° about said axis and said rollers being adapted to form a centerless support for a workpiece; drive means operatively connected to at least one of said rollers for rotating the same so as to drive a workpiece engaged by said rollers; gear means; transmission means interconnecting said gear means and rollers to simultaneously move said rollers by equal amounts toward said central axis when said gear means moves in one direction and to move said rollers by equal amounts away from said central axis when said gear means moves in an opposite direction; and yieldable pressure means operatively connected to said gear means for urging the same in said one direction so as to urge said rollers yieldably toward said central axis.

8. In a centerless cutting apparatus, in combination, at least three rotatably mounted rollers having centers located at equal distances from each other and from a central axis; motion transmitting means; reversible transmission means interconnecting said motion transmitting means and rollers to simultaneously move said rollers by equal amounts toward said central axis when said motion transmitting means moves in one direction and to move said motion transmitting means in an opposite direction when said rollers move away from said central axis; drive means operatively connected to at least one of said rollers for rotating the same so as to rotate a workpiece carried by said rollers; and yieldable pressure means operatively connected to said motion transmitting means to urge the same in said one direction so as to yieldably urge said rollers toward said central axis, said motion transmitting means being movable in said opposite direction against the action of said pressure means upon movement of said rollers away from said central axis.

References Cited in the file of this patent

UNITED STATES PATENTS

| | | |
|---|---|---|
| 432,144 | Muncaster | July 15, 1890 |
| 537,490 | Slater | Apr. 16, 1895 |
| 1,355,616 | Mohn | Oct. 12, 1920 |
| 1,611,418 | Clipsham | Dec. 21, 1926 |
| 1,789,408 | Hultgren | Jan. 20, 1931 |
| 1,839,134 | Van Degrift | Dec. 29, 1931 |
| 1,858,235 | Briney | May 17, 1932 |
| 1,961,091 | Smith et al. | May 29, 1934 |
| 1,994,754 | Cramer et al. | Mar. 19, 1935 |
| 2,085,264 | Lyon | June 29, 1937 |
| 2,281,450 | Motch | Apr. 28, 1942 |
| 2,327,608 | Saltz | Aug. 24, 1943 |
| 2,475,084 | Drissner et al. | July 5, 1949 |
| 2,547,529 | Lichtenberg | Apr. 3, 1951 |
| 2,587,929 | Tyson | Mar. 4, 1952 |
| 2,612,809 | Shager | Oct. 7, 1952 |

FOREIGN PATENTS

| | | |
|---|---|---|
| 100,458 | Germany | Dec. 20, 1898 |
| 313,629 | Germany | July 17, 1919 |
| 363,927 | Germany | Nov. 15, 1922 |
| 551,132 | Germany | May 4, 1932 |